United States Patent

Sainz

[15] 3,702,571
[45] Nov. 14, 1972

[54] VARIABLE SPEED TRANSMISSION

[72] Inventor: Jorge R. Sainz, 1373 S.W. 21st Terrace, Miami, Fla.

[22] Filed: Sept. 17, 1971

[21] Appl. No.: 181,362

[52] U.S. Cl. .................................................. 74/341
[51] Int. Cl. ............................................. F16h 3/22
[58] Field of Search ........................................ 74/341

[56] References Cited

UNITED STATES PATENTS

| 2,926,538 | 3/1960 | Schafer | 74/341 X |
| 2,973,657 | 3/1961 | Baranski | 74/341 X |
| 3,058,365 | 10/1962 | Gerchow | 74/341 |

Primary Examiner—Leonard H. Gerin
Attorney—John Cyril Malloy

[57] ABSTRACT

A gear box providing a continuous flow of power, through a plurality of different gear ratios, from a driving shaft to a driven shaft, a primary drive means being employed to transmit the power through any one of the gear ratios and a secondary drive means being provided to transmit the power from the driving shaft to the driven shaft during the shifting operation from one gear ratio to another, manual control means being provided to disengage the primary drive means during the gear shifting operations and to simultaneously engage the secondary drive means until the primary drive means is reengaged at a different gear ratio.

26 Claims, 6 Drawing Figures

INVENTOR
JORGE R. SAINZ
BY
John Cyril Malloy
ATTORNEY.

INVENTOR
JORGE R. SAINZ
BY
John Cyril Malloy
ATTORNEY.

VARIABLE SPEED TRANSMISSION

BACKGROUND OF THE PRESENT INVENTION

The present invention is directed to a variable speed transmission which is particularly applicable to automobiles for transmitting the power from the engine thereof to the driving wheels, however, it may be employed generally in any machine, such as machine tools, where it is desired that certain mechanisms shall be driven at different speeds at different times.

It is therefore a principal object of the present invention to provide a variable speed transmission to provide an unbroken flow of power, through a plurality of different gear ratios, from a driving shaft to a driven shaft.

A further object of the instant invention is to provide a primary drive means to transmit the power through any one of the plurality of gear ratios and a secondary drive means to transmit the power from the driving shaft to a driven shaft during the shifting from one gear ratio to another of the primary drive means.

A still further object of this invention is to provide a conical cluster of bevel gears on the driving shaft and a power transmission gear, shiftable longitudinally along a splined shaft, which is engageable with any one of said conical cluster, the splined shaft providing a gear drive to the driven shaft.

Another object of the present invention is to provide manual control means for the shiftable idler gears to control the movement of the transmission gear and idler gears, backwardly and forwardly, along said splined shaft.

Still another object of this invention is to provide cam and cam follower means to permit said shiftable transmission gear to sequentially align with and engage each of the conical cluster gears as it is moved backwardly or forwardly along the splined shaft by actuation of the manual control means, and to sequentially become disengaged from each cluster gear as it is moved from one to another thereof.

Yet another object of the present invention is to provide a secondary drive means, drivingly engaged to the driving shaft, which transmits power to the shiftable transmission gear each time said pinion gear is disengaged from any one of the cluster gears.

Another object of the present invention is to provide a pair of conical spiral gears, flanking the conical cluster of gears on its respective sides and in driving engagement therewith, which have axes parallel to the conical cluster of gears in a common plane, one of said spiral conical spiral gears having a right-hand spiral and the other a left-hand spiral.

Another object of the instant invention is to provide an idler gear, between each of said conical spiral gears and the shiftable transmission gear, which is shiftable longitudinally with the pinion gear and rockable into meshing engagement with its respective conical spiral gear by the manual control means each time the transmission gear is disengaged from one of the conical cluster gears.

A still further object of this invention is to provide a spiral groove in each of the conical spiral gears and follower means associated with each of said idlers which is engageable in the spiral groove each time the manual control means is actuated to move the shiftable transmission gear to a higher or lower gear ratio.

A further object of the present invention is to provide a reverse gear mechanism for the variable speed transmission.

DETAILED DESCRIPTION OF THE DRAWINGS

Figure 1:
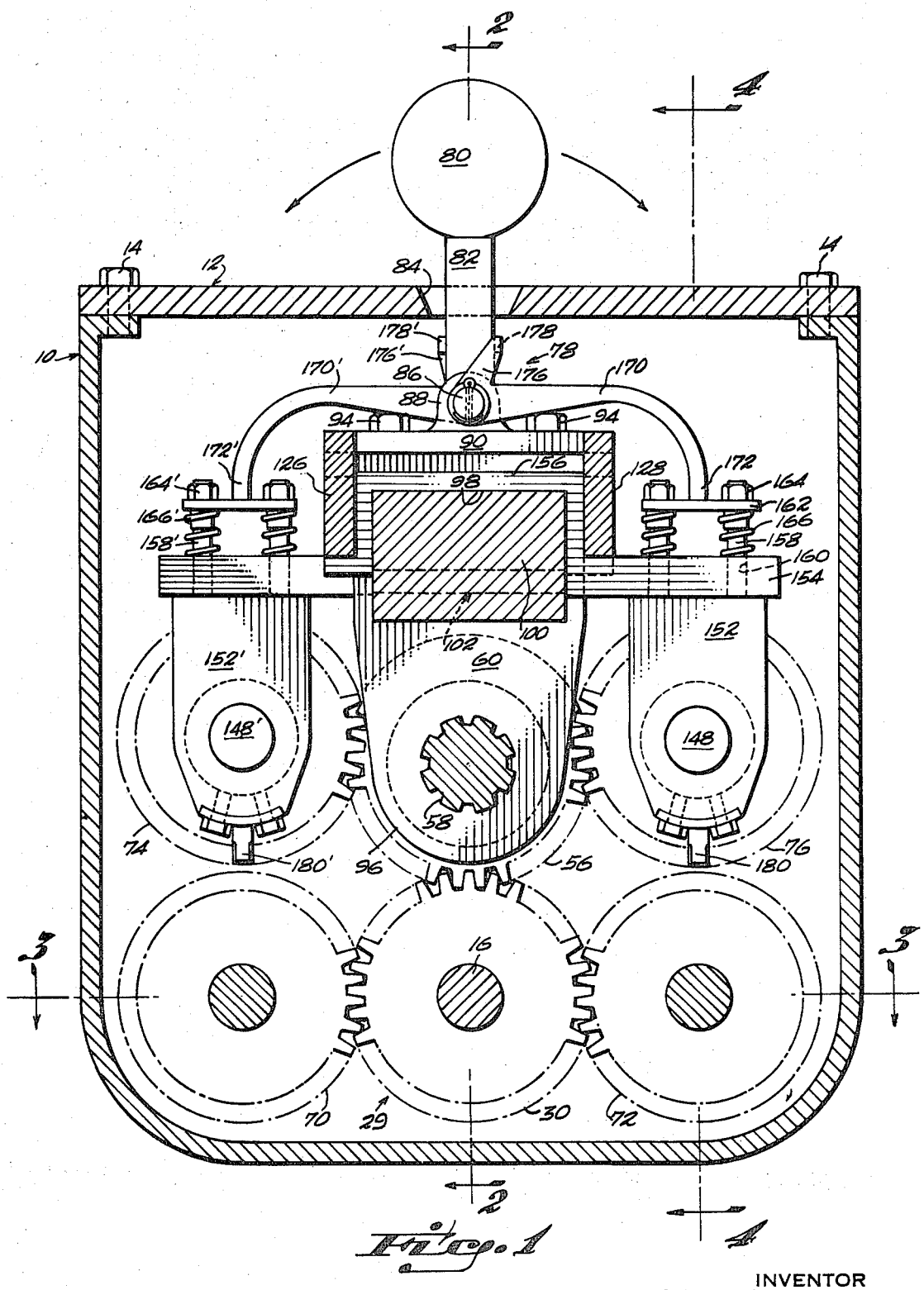
FIG. 1 is a vertical cross sectional view through the driving shaft end of the Variable Speed Transmission of the present invention.

With reference to the drawings in which like reference numerals designate like or similar parts throughout the various views, the numeral 10 indicates the housing which includes a cover plate 12 bolted thereto as at 14. A power input or driving shaft 16 is mounted in suitable bearings 18 and 20 in upstanding webs 22 and 24 in the housing 10 and a power output or driven shaft 26 extends outwardly through appropriate bearing means 27 in the rear end of the housing and includes a universal joint 28.

A conical cluster 29 of thirteen bevel gears 30 through 54 are fixed to the driving shaft 16 and a power transmission gear 56 is slidably engaged on a splined shaft 58 directly above the driving shaft 16. As best illustrated in FIG. 2 the driving shaft 16 is angled relative to the splined shaft 58 to present a line of meshing engagement between the transmission gear 56 and all of the bevel gears 30 through 54 when the transmission gear 56 is moved along the splined shaft by a yoke means 60 which will be subsequently described in detail.

Figure 2:
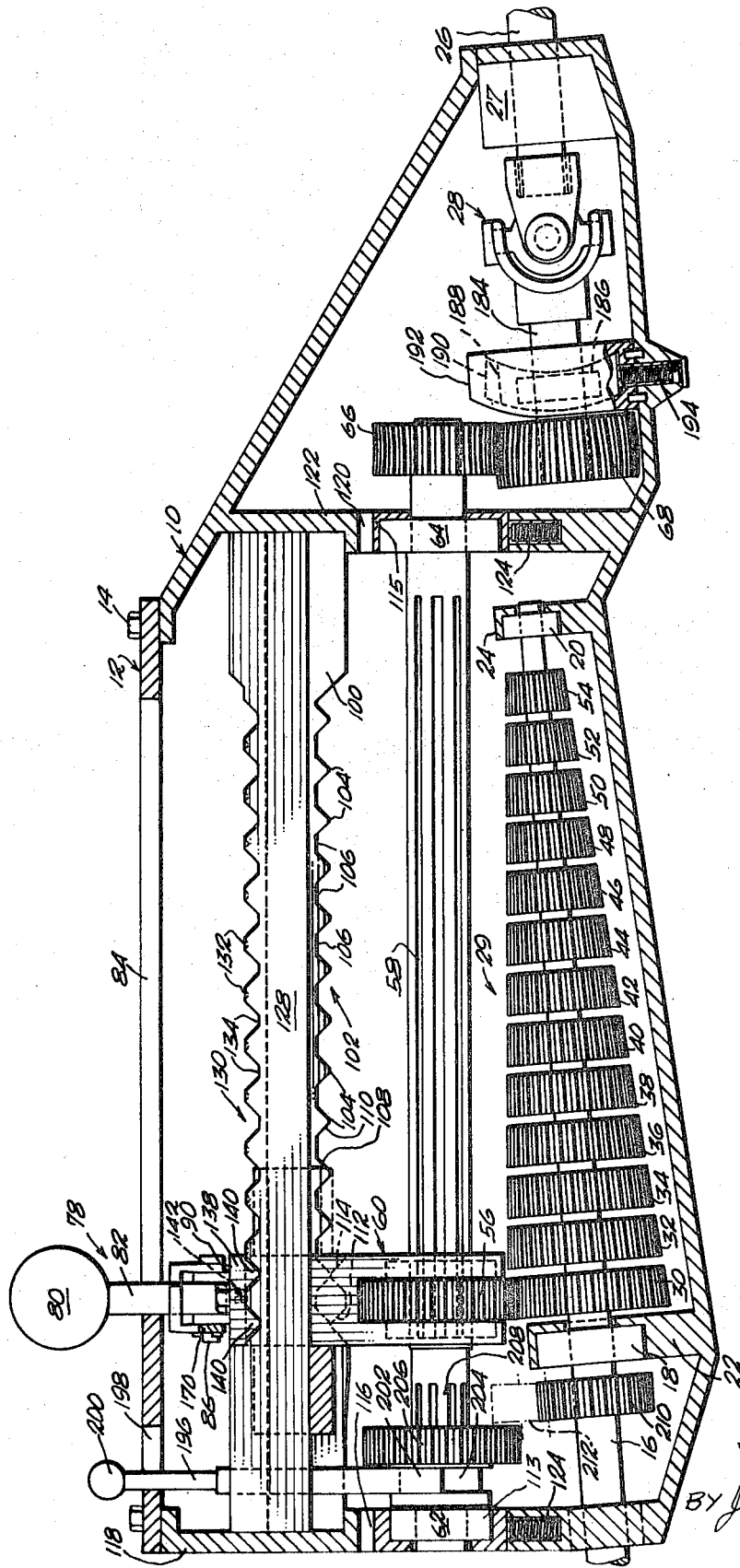
FIG. 2 is a longitudinal, vertical sectional view taken along the line 2—2 in FIG. 1.

As illustrated in FIG. 2, the power transmission gear 56 is in mesh with the largest bevel gear 30 of the cluster and preferably provides a one-to-one drive ratio. The cluster of bevel gears uniformly decrease in diameter toward the rear end of the gear box and preferably provide driving ratios which decrease from the one-to-one ratio to approximately one-to-two and one-half.

The splined shaft is journaled in bearings 62 and 64 and is provided with a gear 66 at its rearward end which is in driving engagement with a gear 68 fixed to the forward end of the driven shaft 26.

Figure 3:
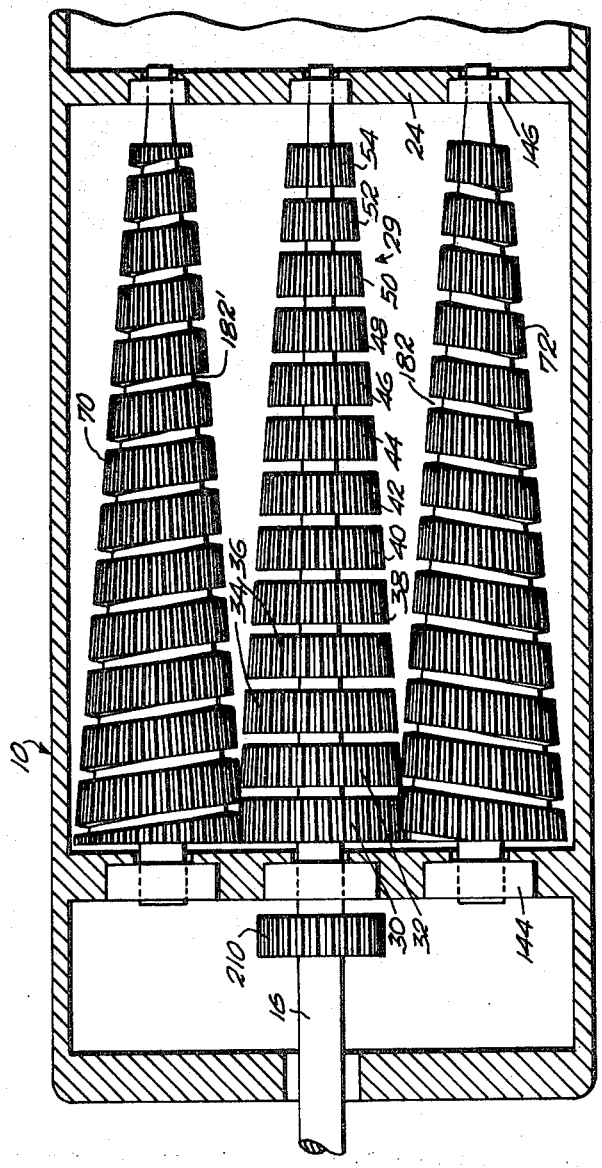
FIG. 3 is a longitudinal, transverse sectional view taken along the line 3—3 in FIG. 1.

A secondary drive means is provided which is comprised generally of a pair of conical spiral gears 70 and 72, FIGS. 1 and 3, flanking the conical cluster, a pair of idler gears 74 and 76, flanking the transmission gear 56 and in engagement therewith and manual control means 78 for disengaging the primary drive, by moving the transmission gear 56 out of engagement with the conical gear cluster, and selectively engaging either the idler gear 74 with the conical spiral gear 70 or the idler gear 76 with the conical spiral gear 72.

As best illustrated in FIG. 1, the largest cluster gear 30 is in constant driving mesh with the respective large ends of the conical spiral gears 70 and 72 and are preferably sized to provide a one-to-one drive ratio. The manual control means 78 is provided to simultaneously disengage the primary drive between any of the cluster gears 30 through 54 and the transmission gear 56, and to selectively engage idler gear 74 with the conical spiral gear 70 to transmit power from the driving shaft 16 to the splined shaft through gear 30, conical spiral gear 70, idler gear 74 and transmission gear 56, or to engage idler gear 76 with the conical spiral gear 72 to transmit power from the driving shaft 16 to the splined shaft 58 through gear 30, conical spiral gear 72, idler gear 76 and transmission gear 56.

As illustrated in FIG. 3, the conical spiral gears 70 and 72 are sized to conform with the conical cluster 29 and preferably provide drive ratios gradually decreasing from one-to-one to one-to-two and one-half. Referring to FIG. 1, it is seen that the drive ratios between the transmission gear 56, idler gears 74 and 76, the large ends of the conical spiral gears 70 and 72 and the large cluster gear 30 are all one-to-one.

The manual control means is illustrated in all of the views except FIG. 3 and includes a knob 80 fixed to an arm 82 which extends inwardly through an elongated slot 84 in the cover plate 12 to a point of pivotal attachment 86 between a pair of lugs 88-88, extending upwardly from a transverse carriage plate 90. The yoke 60 is fixed by bolts 94 to the carriage plate and extends downwardly therefrom to embrace the transmission gear 56 between the arms 96-96 thereof to impart longitudinal movement to the transmission gear 56 along the splined shaft 58 into sequential meshing engagement with the conical cluster gears 30 through 54.

Figure 6:
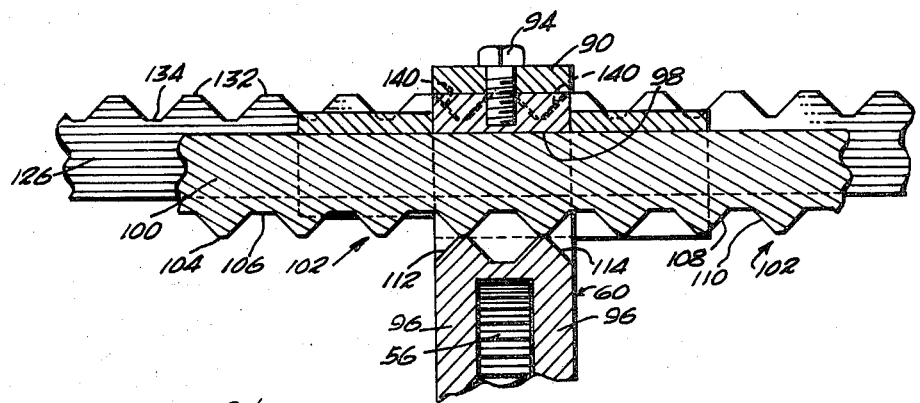
FIG. 6 is a vertical sectional view taken along the line 6—6 in FIG. 5.

As best illustrated in FIGS. 1, 2 and 6, the yoke 60 is provided with a generally rectangular through opening 98 for sliding engagement along a longitudinally extending cam bar 100 which is fixed at both ends by any convenient means to the housing 10. The bottom of the cam bar 100 is provided with a longitudinal cam track 102 consisting of a plurality of evenly spaced inverted highs 104 and lows 106, each being provided with a pair of inwardly diverging side portions 108 and 110 connecting between the adjacent highs and the intermediate low.

The yoke 92 is provided with follower means comprising a pair of transverse followers 112 and 114 extending upwardly from the floor of the opening 98. As best illustrated in FIG. 2, the spacings of the plurality of highs 104 and lows 106 conform with the spacings of the conical, beveled cluster gears 30 through 54 and each high 104 is positioned to maintain the transmission gear 56 in meshing engagement with one of said cluster gears.

With further reference to FIG. 2, the splined shaft 58 is journaled in bearings 62 and 64, carried in slide blocks 113 and 115 which are slidably journaled in openings 116 in the front wall 118, and 120 in the intermediate wall 122 of the housing 10. As illustrated, the slide blocks 113 and 115 are spring-loaded as at 124 to constantly urge the splined shaft 58 upwardly, however, when the transmission gear 56 is in alignment with any of the conical cluster gears 30 through 54, the upwardly extending followers 112 and 114 are in engagement with a pair of cam highs 104 to hold the splined shaft 58 downwardly against the pressure of the springs 124 to maintain the power transmission gear 56 on splined shaft 58 in meshing engagement with one of said conical cluster gears 29.

When the manual control means 78 is moved backwardly or forwardly, the followers 112 and 114 are moved upwardly into engagement with a pair of cam lows 106 by the springs 124, thereby, moving the transmission gear 56 out of engagement with the conical gear cluster 29.

A pair of additional longitudinal cam bars 126 and 128 are fixed in the housing in a manner similar to the cam bar 100. Cam bars 126 and 128 flank the two sides of the yoke and are parallel to the cam bar 100. Both cam bars 126 and 128 are provided with identical longitudinal cam tracks 130 and provide highs 132 and lows 134 in an identical spaced relation to the highs and lows 104 and 106 of cam bar 100, however, the highs and lows 132 and 134 are staggered relative to the highs and lows 104 and 106, that is, the positions of the highs 132 coincide with the positions of the lows 106 and the positions of the lows 134 coincide with the positions of the highs 104.

As best illustrated in FIGS. 2 and 6, the edges 136 and 138 of the transverse carriage plate 90 are provided with identical downwardly extending followers 140, 140 which are adapted to engage a pair of cam lows 134 on the respective cam bars 126 and 128 each time the transmission gear 56 is in meshing engagement with one of the conical cluster of gears 30 through 54. Detent means, generally indicated at 142, may be provided to help position the manual shifting means 78 whenever the transmission gear 56 is in meshing engagement with one of the cluster gears 29.

Figure 4:
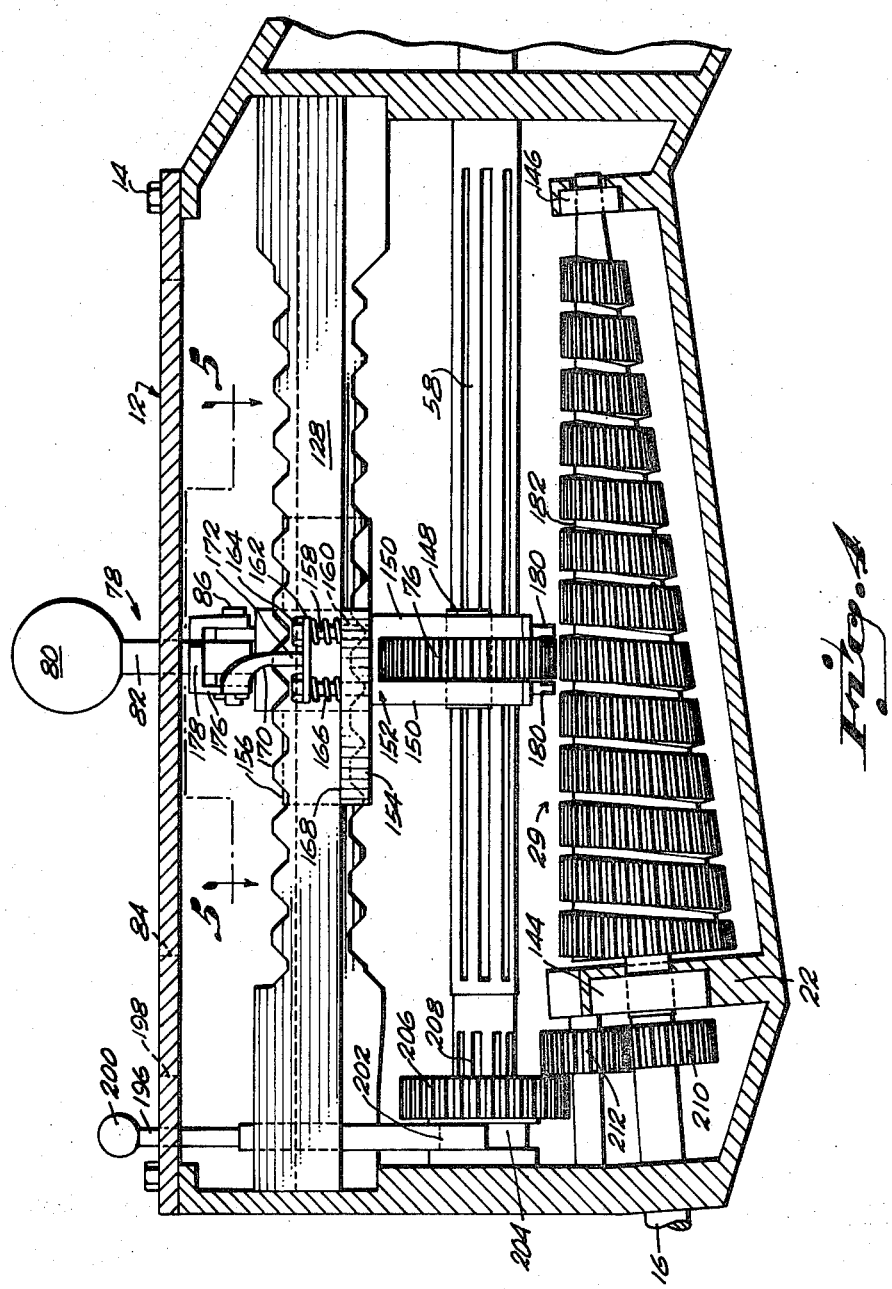
FIG. 4 is a longitudinal, vertical sectional view taken along the line 4—4 in FIG. 1.

FIG. 4 illustrates the relationship of one conical spiral gear 72 relative to the idler 76 and as the relationship between the conical spiral gear 70 and idler 74 is identical in all respects, the following description applies to both conical spiral gears and idlers, the only difference between the conical spiral gears resides in the fact that one provides a right-hand spiral and the other is a left-hand spiral as illustrated in FIG. 3.

The conical spiral gear 72 is provided with the same angular relationship between the axis thereof and the axis of the idler 76 as between the axis of the conical cluster 29 and the splined shaft 58 to provide a line of meshing engagement therebetween. As illustrated the conical spiral gear 72 is journaled in bearings 144 and 146 in the respective housing webs 22 and 24.

Figure 5:
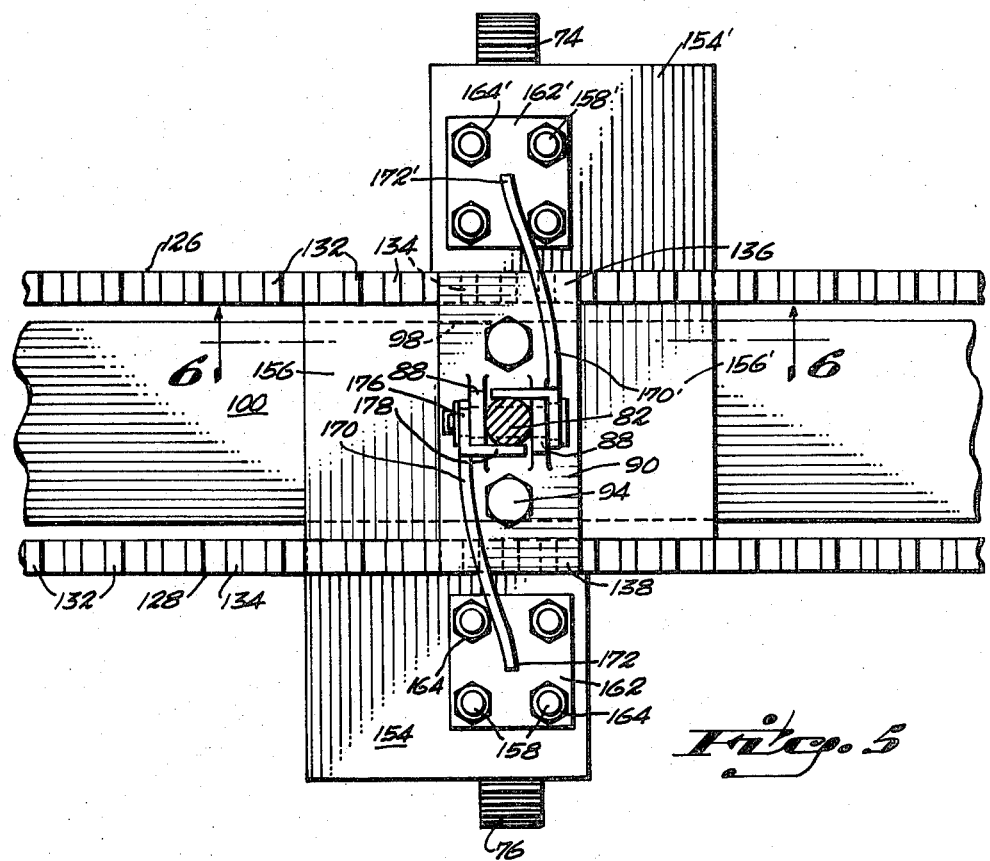
FIG. 5 is a transverse sectional view taken along the line 5—5 in FIG. 4.

The idler gear 76 is rotatably journaled on a stub shaft 148 between the arms 150, 150 of a yoke 152, extending vertically downwardly from an outrigger plate 154. Referring to FIGS. 1, 4 and 5, the outrigger plate 154 extends outwardly from a saddle 156 which straddles the top portion of the cam bar 100 and is adapted to slide therealong.

The yoke 152 includes a plurality of pins 158 fixed to and extending upwardly therefrom through mating holes 160 in the outrigger plate 154. As best illustrated in FIGS. 1 and 4, a pressure plate 162 is provided on the pins adjacent their upper ends, and nuts 164 are threaded on each pin against the pressure plate 162 to provide substantial upwardly directed compression forces by compression springs 166 which are circumposed about each pin 158 between the pressure plate 162 and the top face 168 of the outrigger plate 154. In this manner, the idler gear 76 is normally maintained upwardly out of meshing engagement with the conical spiral gear 72.

An elongated outwardly and downwardly extending lever arm 170 is pivotally carried on the pivot pin 86 and provides a distal end portion 172 which is in engagement with the top surface of the pressure plate 162. A short lever arm 176 extends upwardly and outwardly from the arm 170 adjacent to the pivot pin 86 and provides a rearwardly extending finger 178, generally parallel with the pivot pin 86, in engagement with the handle rod 82 whereby pivotal movement of the handle rod 82 to the right as seen in FIG. 1 imparts a downward swinging movement to the lever arm 170 to move the pressure plate 162 downwardly against the compression forces of the springs 166, permitting the yoke and idler gear assembly 152 and 76 to move downwardly until the gear 76 meshes with the conical spiral gear 72.

Referring to FIGS. 1 and 4, each arm 150, 150 of yoke 152 is provided with a downwardly extending follower pin 180, 180 which are spaces apart a distance to become engaged in a spiral groove 182 on both sides of the spiral lead provided by the gear teeth on the conical spiral gear 72. The conical spiral gear 72 is driven in a counterclockwise direction by the large bevel gear 30 on the driving shaft 16 and when the idler gear 76 is moved into engagement therewith as above described, the follower pins 180, 180 engage in the spiral groove 182 and are driven rearwardly providing a constantly decreasing gear ratio. Since the follower pins 180, 180 are fixed to the yoke, carried by the outrigger plate 154 and saddle 156, the rearward movement is transmitted to the saddle which, as seen in FIG. 5, lies against the front face of the yoke 92 carrying the transmission gear 56. The yoke 92 and transmission gear 56 are therefore moved rearwardly in meshing engagement with the idler gear 76. As the rearward movement is initiated, the cam followers 112 and 114 move upwardly into engagement with lows 106 of the cam track 102, disengaging the drive between the transmission gear 56 and the conical gear cluster 29 as previously described, however, power is transmitted to gear 56 through gears 30, 72 and 76.

When the gears 76 and 56 have moved rearwardly a distance equal to the width of one of the conical cluster gears, the cam followers 112 and 114 will have re-engaged a pair of highs 104 to remesh the transmission gear 56 with one of the conical cluster gears 29. When the transmission gear 56 is disengaged upwardly from any of the conical cluster gears 29 as described, the yoke 92, carriage plate 90 and control arm and knob 82 and 80 also move upwardly, therefore, the operator is aware that the gear 56 has re-engaged one of the cluster gears 29 when the knob 80 descends and he may then release the knob and the compression springs 166 will return the arm 82 to a vertical position and disengage gear 76 from gear 72 to maintain the drive directly through the transmission gear 56 and the newly engaged conical cluster gears 129. The operator may downshift through two or more speeds, all thirteen if desired, by holding the control knob 80 over to the right as seen in FIG. 1 and the transmission gear 56 will continue to shift into and out of mesh with plurality of cluster gears to provide an ever decreasing gear ratio.

During each shifting operation the secondary drive means comprising the meshing of idler 76 with the conical spiral gear 72 will provide a continuous flow of power from the driving shaft 16 to the driven shaft 26 in the manner described above.

As best illustrated in FIGS. 3 and 4, the conical spiral gear 72 provides a left-handed spiral of gear teeth and groove 182 and the conical spiral gear 70 provides a righthanded spiral of gear teeth and groove 182'. As all of the structure and operation relative to the conical spiral gear 70 and manual control means 78 are identical to the above description of the conical spiral gear 72 and the control means 78, prime designations will be applied to all like parts thereon. It is to be noted however, that the right-handed spiral teeth and groove 182' serve to upshift to a higher gear ratio. In other words, when the control handle 82 and knob 80 are pivoted to the left as seen in FIG. 1, the transmission gear 56 will move forwardly to a progressively higher gear ratio.

It should also be noted that the saddle 156' is rearwardly of and against the back face of the yoke 92 to move the entire assembly carrying the three gears 56, 74 and 76 forwardly in unison when the control mechanism 78 is actuated to upshift the transmission.

The forward end 184 of driven shaft 26 is journaled in bearings 186 carried in an arcuate slide block 188 which is slidably engaged in an arcuate opening 190 in an upwardly extending web 192 which is fixed within the forward end of the housing 10. Compression spring means 194 is provided to urge the slide block 188 upwardly to maintain the gear 68 in constant meshing engagement with the gear 66, fixed to the outer end of the splined shaft 58.

A reversing mechanism is provided at the forward end of the gear box which includes a shift lever 196, extending outwardly through an appropriate slot 198 in the cover plate 12. A knob 200 is provided on the outer distal end of the lever 196. The inner end of the lever 196 includes a yoke 202 engaged in an annular groove 204, provided on a gear 206 which is slidably engaged on a splined end portion 208 of the splined shaft 58. The driving shaft 16 includes a pinion gear 210 which is drivingly engaged to gear 206 through an idler gear 212 when the shift lever 196 is manipulated to move gear 206 into meshing engagement with the idler gear 212, providing a reverse direction of rotation to the splined shaft 58.

What is claimed is:
1. A variable speed transmission comprising,
A. a main housing including,
  1. a forward end,
  2. a rearward end;
B. a power transmission shaft extending longitudinally between said forward and rearward ends;
C. a power transmission gear slidably keyed to said transmission shaft for longitudinal movement along the main length thereof;
D. a driving shaft extending from a power source through said forward end and having,
  1. a conical cluster of gears fixed to the inner portion thereof, said inner portion being positioned and angled relative to said power transmission shaft so as to provide a line of meshing engagement therealong between said power transmission gear and any one of said conical cluster of gears;

E. a pair of conical spiral gears, each flanking a respective side of said conical cluster and having an axis parallel therewith, one of said conical spiral gears providing a right-hand gear spiral and the other a left-hand gear spiral, both providing a spiral groove between the gear spirals, the large end of both of said conical spiral gears being in constant meshing engagement with the largest gear of said conical cluster;

F. a pair of idler gears, each flanking a respective side of said power transmission gear in constant meshing engagement therewith and being shiftable into meshing engagement with a respective right or left-hand conical spiral gear anywhere along the length thereof, each of said idler gears including follower means to engage in said spiral groove of its respective conical spiral gear, when said idler gear and conical spiral gear are in meshing engagement, to provide longitudinal movement to said power transmission gear;

G. means interconnecting said power transmission gear with both of said idler gears to provide transversely aligned longitudinal movement thereof;

H. means to engage said power transmission gear with any one of said conical cluster of gears when said power transmission gear is in alignment therewith and to disengage same during movement of said transmission gear from one to another of said conical cluster of gears;

I. means to selectively shift either of said idler gears into meshing engagement with its respective right or left-handed conical spiral gear whereby power from said driving shaft is transmitted to said power transmission gear through said selected idler gear and its respective conical spiral gear to provide a constant flow of power during said transmission gear movement, both of said idler gears and said power transmission gear thereby being moved either longitudinally forwardly or backwardly depending upon which idler gear is shifted into engagement with its respective right or left-hand conical spiral gear;

J. a driven shaft; and

K. gear means drivingly engaging said power transmission shaft to said driven shaft.

2. A variable speed transmission as defined in claim 1 in which said conical cluster comprises thirteen gears having a uniformly constantly decreasing diameter from the largest gear of said cluster to the smallest gear of said cluster.

3. A variable speed transmission as defined in claim 2 in which the number of gear teeth on each of said conical cluster is decreased by one tooth from gear to gear beginning with said largest gear.

4. A variable speed transmission as defined in claim 1 in which said power transmission gear, both of said idler gears, said largest cluster gear and the large ends of both of said conical spiral gears provide a one-to-one gear ratio relative to each other.

5. A variable speed transmission as defined in claim 4 in which said gear cluster and both of said conical cluster gears provide a complementarily constantly decreasing gear ratio, from the large ends thereof to the small ends thereof, relative to said power transmission gear.

6. A variable speed transmission as defined in claim 1 in which said power transmission gear is captivated between the opposed arms of a first yoke means.

7. A variable speed transmission as defined in claim 6 in which said pair of idler gears are rotatably mounted on stub shafts carried by second and third yoke means.

8. A variable speed transmission as defined in claim 6 in which said means to engage said power transmission gear comprises a first longitudinal extending bar in a fixed relation to said main housing, an aperture through the upper end of said first yoke means for the reception of said first longitudinal bar to provide sliding engagement therealong by said first yoke means, a longitudinal cam track along the bottom side of said first bar providing a plurality of evenly spaced inverted highs and lows, the spacings between the plurality of highs and lows conforming to the spacings between the gears of said conical cluster, upwardly extending cam follower means on the bottom of said aperture, and compression spring means constantly urging said cam follower means against said cam track.

9. A variable speed transmission as defined in claim 8 in which both ends of said power transmission shaft are rotatably journaled in blocks, vertically, slidable in apertures in said main housing, and said compression spring means comprises a compression spring for each of said blocks mounted in said main housing and constantly urging the respective blocks upwardly.

10. A variable speed transmission as defined in claim 9 in which each of said inverted highs is positioned to move said power transmission gear into engagement with one of said conical cluster gears when engaged by said upwardly extending follower means and said power transmission gear is moved out of engagement therewith by said compression springs each time said upwardly extending follower means is moved out of engagement with one of said inverted highs.

11. A variable speed transmission as defined in claim 10 including second and third longitudinal extending bars in a fixed relation to said housing, each of said bars flanking a respective side of the upper end of said first yoke means, the upper edges of each of said bars including a cam track providing a plurality of evenly spaced upwardly extending highs and lows which are staggered relative to said inverted highs and lows on said first bar, a transverse carriage plate, fixed as by bolts to the upper end of said first yoke means, including opposed outwardly extending end portions, each of which provides downwardly extending cam follower means slidable along the respective cam tracks provided on said second and third bars, each of said upwardly extending lows being positioned relative to one of said conical cluster gears to maintain said one in meshing engagement with said power transmission gear.

12. A variable speed transmission as defined in claim 11 including detent means to accurately position said downwardly extending follower means relative to each of said upwardly extending lows.

13. A variable speed transmission as defined in claim 7 in which the first of said pair of idler gears is rotatably mounted in said second yoke means and said means interconnecting includes a first saddle means slidably straddling the upper portion of said first longitudinal bar in engagement with the forward face of said first yoke means, a first outwardly extending outrigger plate, carried by said first saddel, and yieldable means connecting said second yoke means to said first outwardly extending outrigger plate in a downwardly extending disposition over said left-hand conical spiral gear.

14. A variable speed transmission as defined in claim 13 in which the second of said pair of idler gears is rotatably mounted in said third yoke means and said means interconnecting includes a second saddle means slidably straddling the upper portion of said first longitudinal bar in engagement with the rearward face of said first yoke means, a second outrigger plate, extending outwardly in a direction opposed to said first outrigger plate, and yieldable means connecting said third yoke means to said second outrigger plate in a downwardly extending disposition over said right-hand conical gear.

15. A variable speed transmission as defined in claim 14 in which said yieldable means connecting each of said second and third yoke means to the respective first and second outrigger plates comprises, a plurality of pins fixed to the respective yokes and extending upwardly through complementary holes in the respective outrigger plates and coil springs, circumposed about each of said pins above the respective outrigger plates, under compression between the upper surface of each of the respective outrigger plate and a pressure plate fixed relative to the upper ends of said pins.

16. A variable speed transmission as defined in claim 15 in which said means to selective shift comprises a shift arm, pivotally attached to lug means extending upwardly from said carriage plate, which extends upwardly through an elongated slot in a cover plate fixed to the top of said main housing, a first lever means, extending between said shift arm and said pressure plate, carried by said second yoke, to compress said springs to move said second yoke means downwardly to engage said first idler gear with said left-hand conical spiral gear when said shift arm is pivoted in a first direction.

17. A variable speed transmission as defined in claim 16 including a second lever means, extending between said shift arm and said pressure plate, carried by said third yoke, to compress said springs to move said second yoke means downwardly to engage said second idler gear with said right-hand conical spiral gear when said shift arm is pivoted in a second direction.

18. A variable speed transmission as defined in claim 17 in which each of said first and second lever means comprises an elongated lever having one end, normally in contact with a respective pressure plate and a short lever normally in contact with said shift arm, said first and second lever means being fulcrumed, between said long and short levers, on opposed ends of said arm pivot.

19. A variable speed transmission as defined in claim 16 including a hand grip knob fixed to the upper distal end of said shift arm.

20. A variable speed transmission as defined in claim 1 in which said gear means comprises a gear on the rearward end of said power transmission shaft in driving engagement with a gear on the forward end of a forward portion of said driven shaft.

21. A variable speed transmission as defined in claim 20 in which said forward portion is connected to the main length of said driven shaft by a universal joint.

22. A variable speed transmission as defined in claim 20 in which said forward portion is rotatably journaled in an arcuate block slidable in an arcuate aperture in an upstanding web fixed within said main housing, and compression spring means mounted in said main housing constantly urging said gear on the forward end into engagement said gear on the rearward end.

23. A variable speed transmission as defined in claim 7 in which said spiral groove follower means comprises a pin extending downwardly from the lowermost portion of each arm of said second and third yoke means.

24. A variable speed transmission as defined in claim 1 including a reverse gear means.

25. A variable speed transmission as defined in claim 24 in which said reverse gear means includes a pinion gear fixed to said driving shaft in mesh with an idler gear and a shiftable gear slidably keyed to said power transmission shaft and means to selectively engage and disengage said shiftable gear with said idler gear.

26. A variable speed transmission as defined in claim 25 in which said means to selectively engage and disengage comprises a shift lever having a portion extending upwardly through a relatively short slot in a main housing cover plate and an inwardly extending portion providing a yoke in engagement with an annular groove on said shiftable gear.

* * * * *